No. 634,864. Patented Oct. 17, 1899.
L. W. BATES.
DREDGING MACHINERY.
(Application filed Mar. 4, 1895.)
(No Model.) 7 Sheets—Sheet 4.

Witnesses
Cele N Burdine
C. B. Bull

Inventor
Lindon W. Bates
by Dodge Sons
Attorneys.

No. 634,864. Patented Oct. 17, 1899.
L. W. BATES.
DREDGING MACHINERY.
(Application filed Mar. 4, 1895.)
(No Model.) 7 Sheets—Sheet 5.
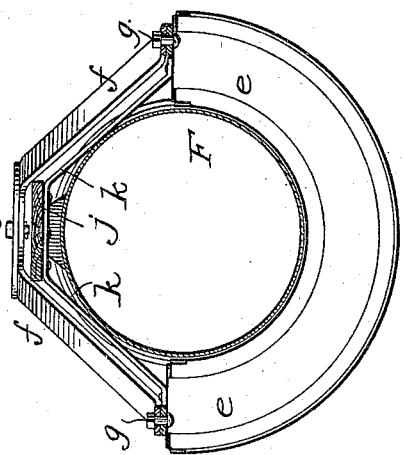
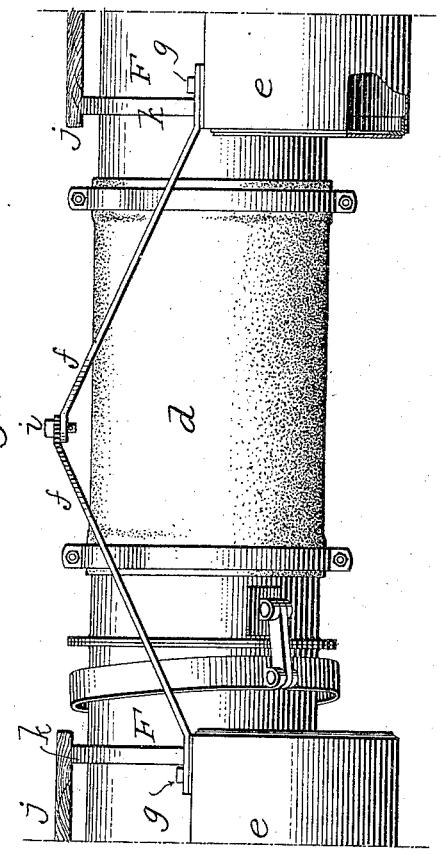
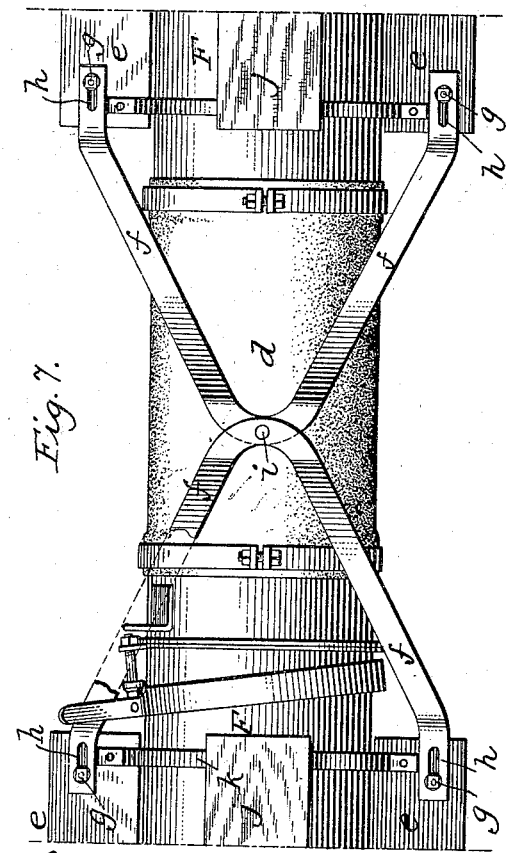
Witnesses Lindon W. Bates, Inventor No. 634,864. Patented Oct. 17, 1899.
L. W. BATES.
DREDGING MACHINERY.
(Application filed Mar. 4, 1895.)
(No Model.) 7 Sheets—Sheet 6.
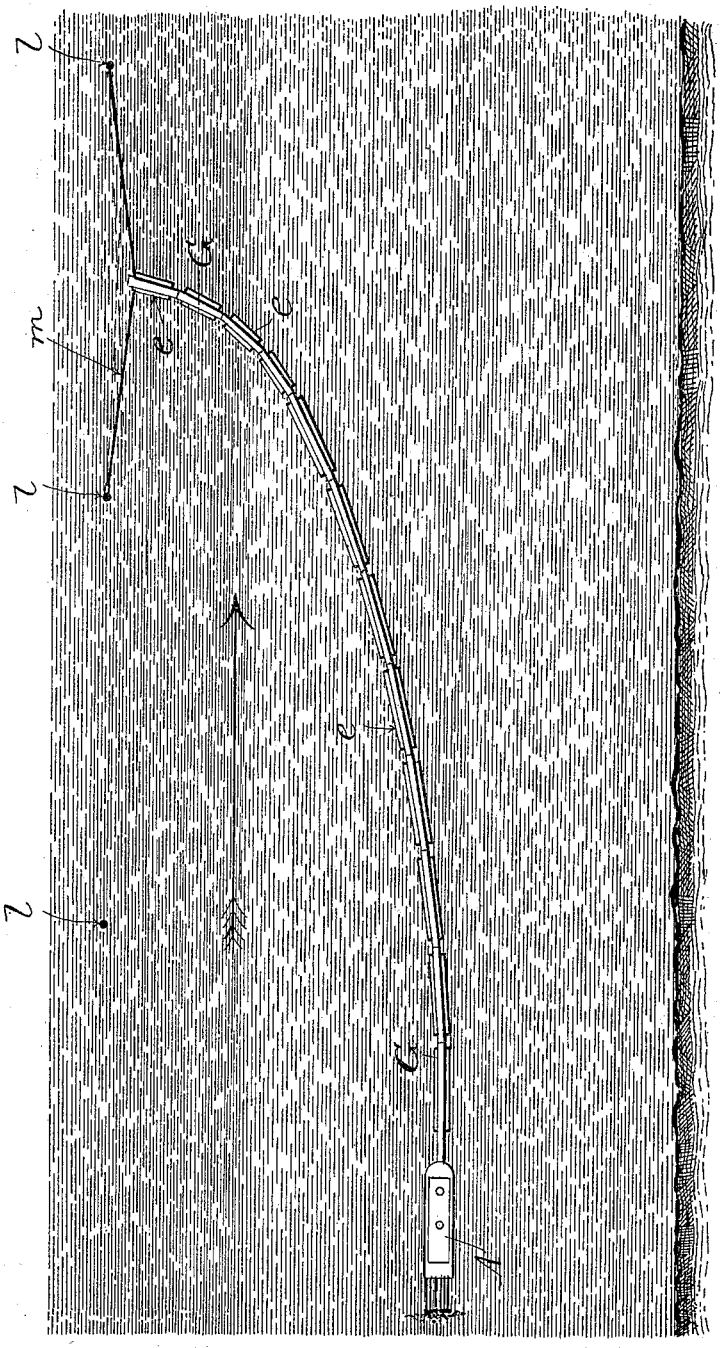
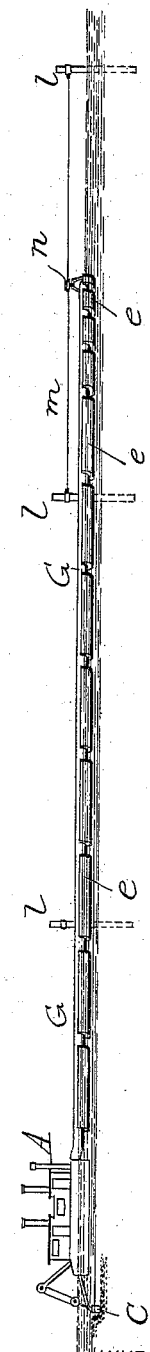
WITNESSES:
INVENTOR:
Lindon W. Bates,
BY
Dodge Sons,
ATTORNEYS.
THE NORRIS PETERS CO., PHOTO-LITHO., WASHINGTON, D. C.

No. 634,864. Patented Oct. 17, 1899.
L. W. BATES.
DREDGING MACHINERY.
(Application filed Mar. 4, 1895.)
(No Model.) 7 Sheets—Sheet 7.
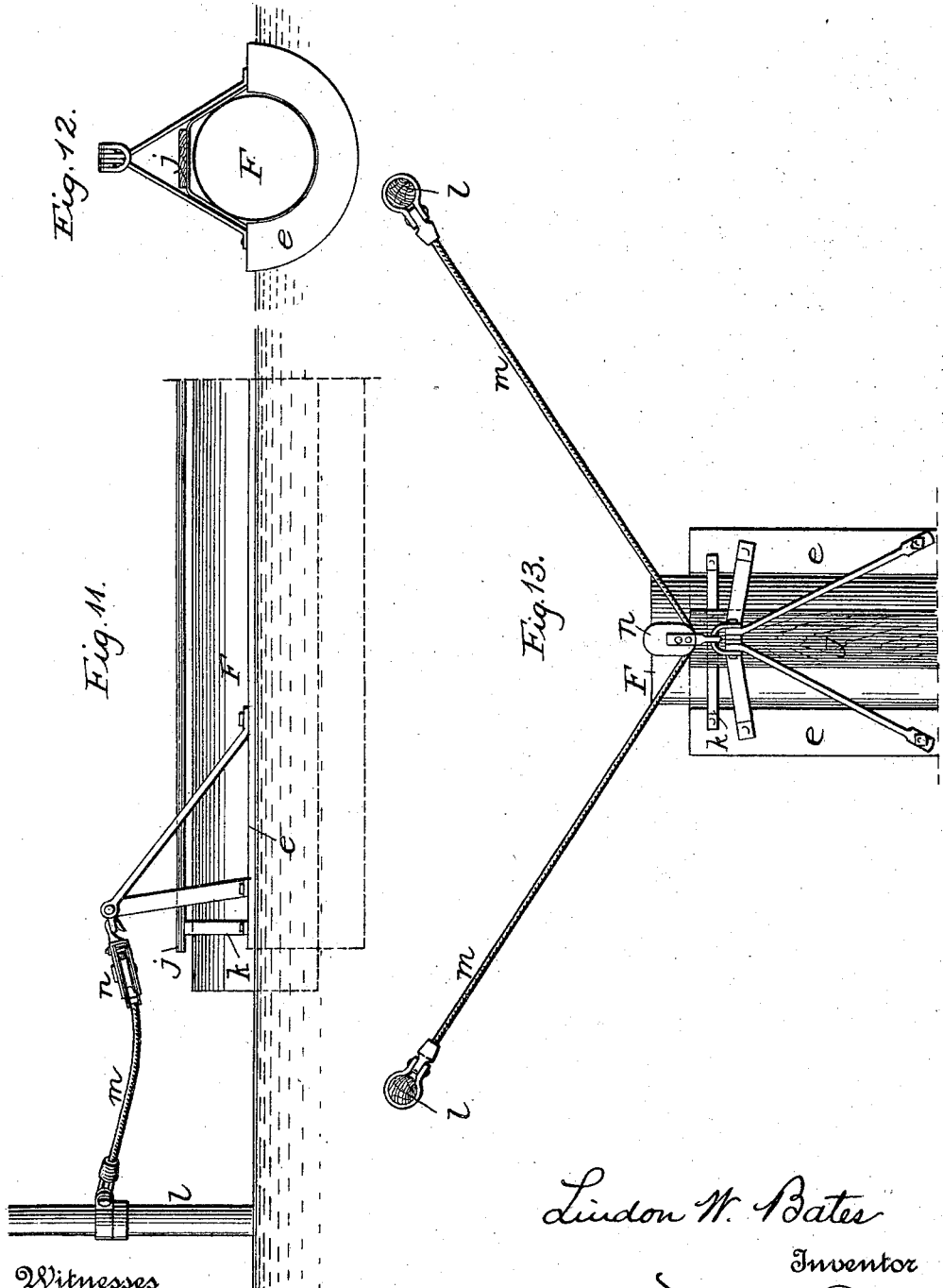

UNITED STATES PATENT OFFICE.

LINDON W. BATES, OF CHICAGO, ILLINOIS.

DREDGING MACHINERY.

SPECIFICATION forming part of Letters Patent No. 634,864, dated October 17, 1899.

Application filed March 4, 1895. Serial No. 540,526. (No model.)

*To all whom it may concern:*

Be it known that I, LINDON W. BATES, a citizen of the United States, residing at Chicago, in the county of Cook and State of Illinois, have invented certain new and useful Improvements in Dredging Machinery, of which the following is a specification.

My invention relates to dredging; and it consists in a novel construction of the dredge and its appurtenances.

Figure 1:
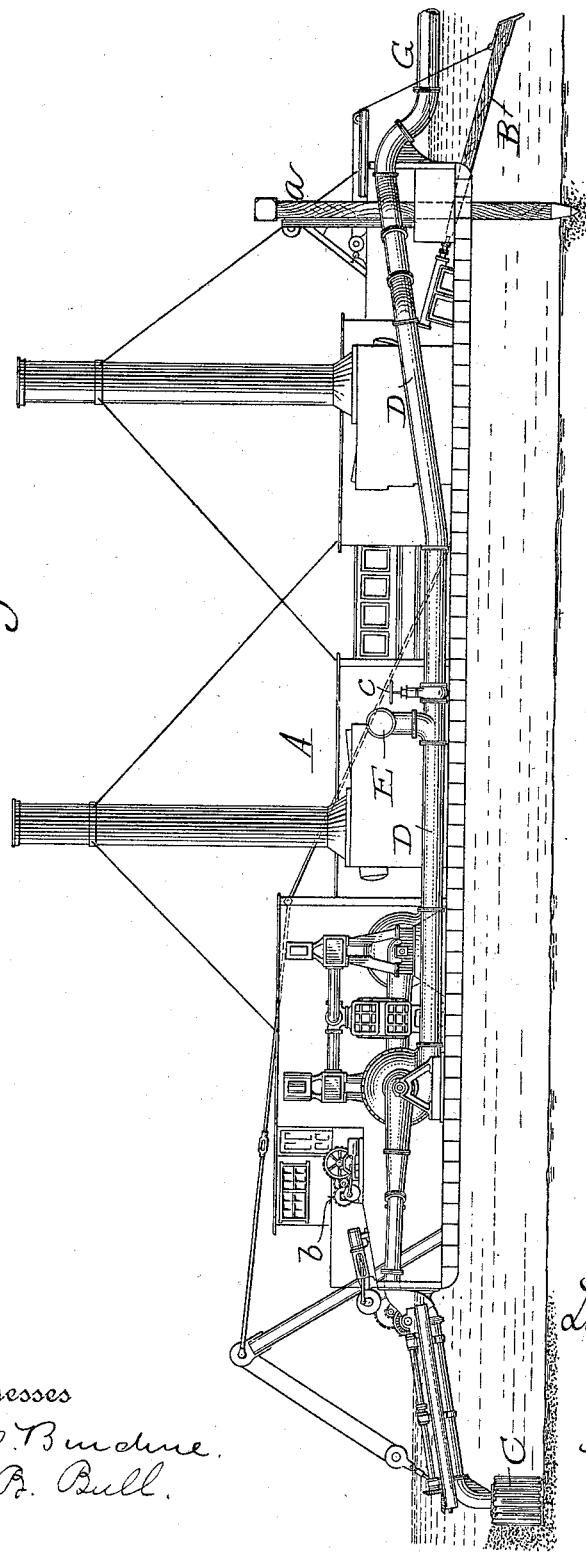
Figure 2:
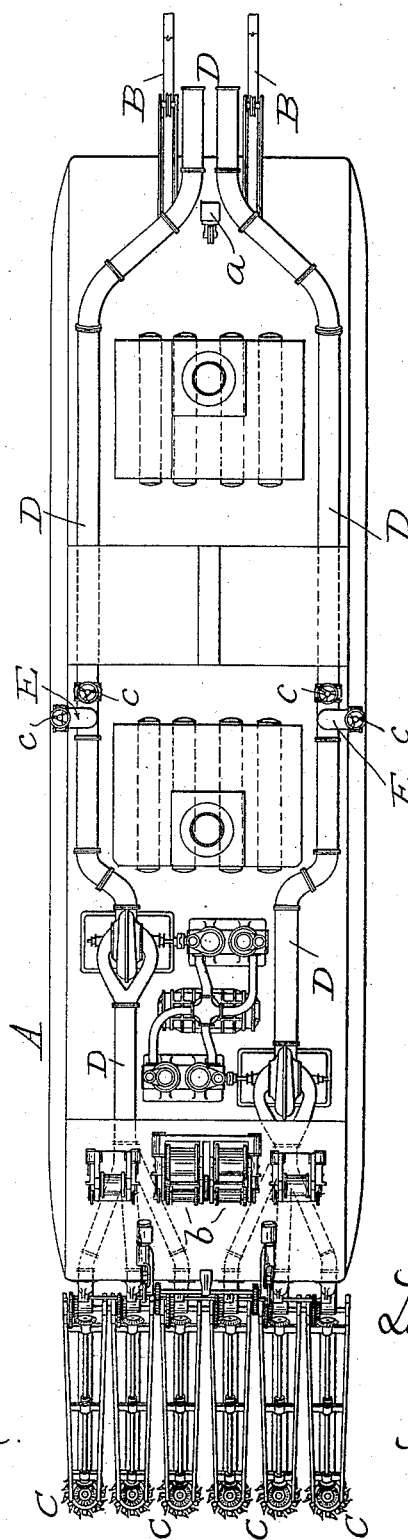
Figure 3:
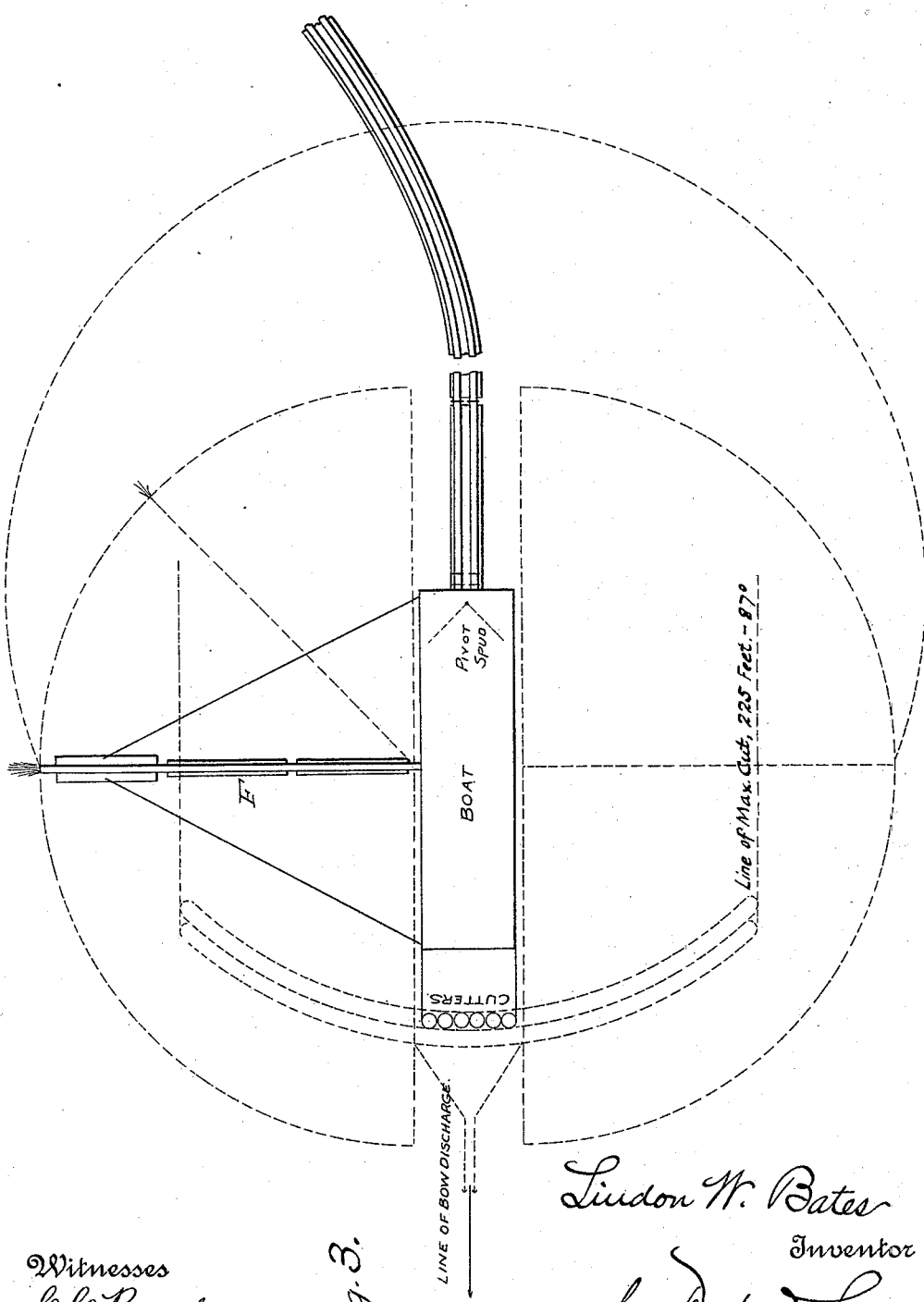
Figure 4:
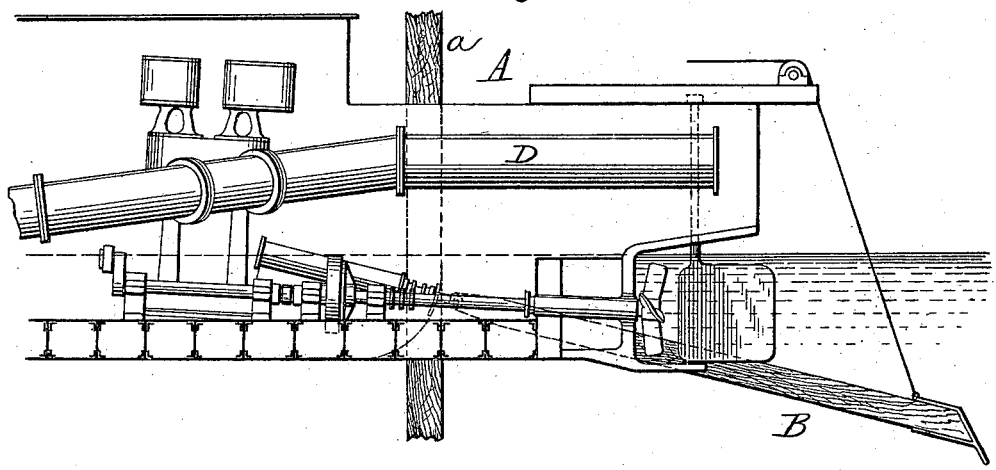
Figure 5:
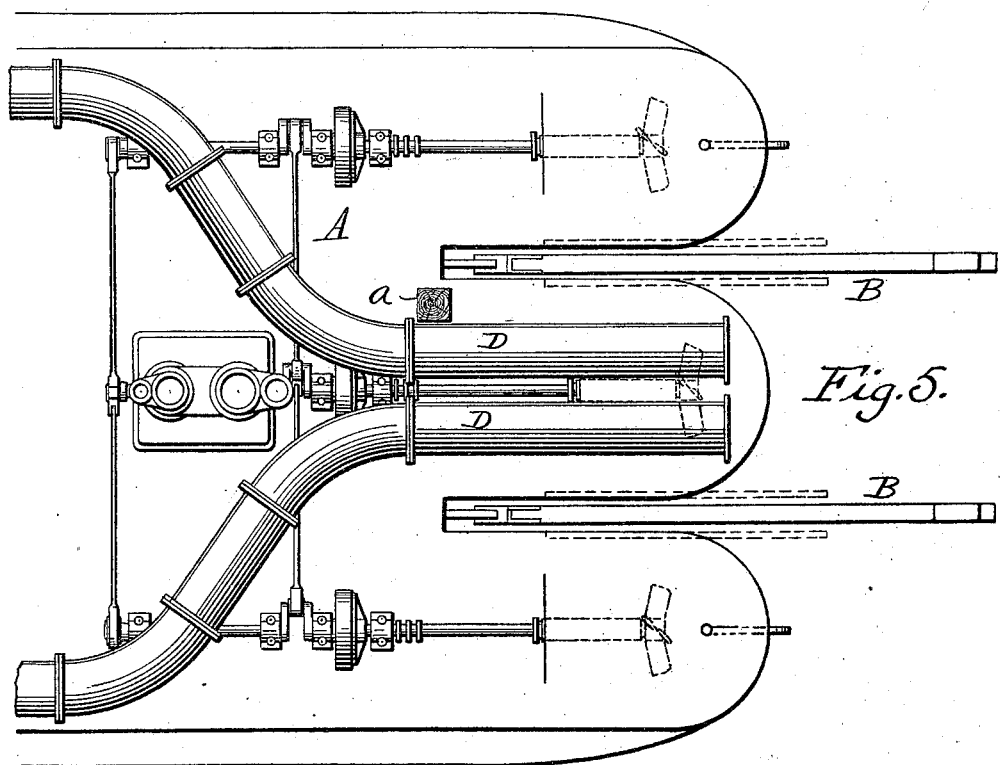

In the drawings, Figure 1 is a vertical longitudinal sectional view through my improved dredger; Fig. 2, a plan view; Fig. 3, a diagrammatic view; Figs. 4 and 5, views illustrating modifications in the arrangement of the pushing-spuds; Figs. 6 to 8, inclusive, views illustrating the construction of the discharge-pipe; and Figs. 9 to 13, inclusive, views showing the means for maintaining the end of the discharge-pipe in proper position.

A indicates the dredge-boat or dredger proper, provided with the usual boilers, pumps, and engines. At the stern the boat is provided with a vertically-adjustable pivot-spud $a$, Figs. 1 and 2, while at the bow the boat is provided with the warping-drums $b\ b$, which will be actuated by engines mounted, preferably, in the same frame with the respective drums, the warping-cables (not shown) extending from said drums to suitable posts or anchors suitably located in the stream or on shore.

In order to propel the boat while resetting or changing the warping-anchors or to assist in the warping, I provide the boat at the stern with one or more push-spuds B, as shown in Figs. 1, 2, 4, and 5, which will be actuated in any suitable manner, said spuds being located in a wellway in the stern. If desired, screw-propellers may also be placed at the stern, as in Figs. 4 and 5, to assist in moving the dredge or propelling the dredge from place to place.

At the bow the boat or dredge is provided with a series of cutters C C, which are arranged substantially as in my Patent No. 545,762, dated September 3, 1895. These cutters disintegrate the material which the pump-suction draws through the suction-pipes, while the pump forces it into the discharge-pipes D D, which, as shown in Fig. 2, extend lengthwise of the boat and pass off at the stern.

At each side of the boat the pipes D D are provided each with a lateral outlet E, to which is connected by a joint the lateral discharge-pipe F, Fig. 3, said pipes D E being provided with suitable valves $c$, as shown in Fig. 2. This lateral discharge-pipe may be supported by suitable floats or pontoons, made self-sustaining, as in my pending application, Serial No. 522,015, filed September 4, 1894, or as shown in Figs. 6 to 9, inclusive, upon reference to which it will be seen that the pipes F, which are made in sections connected by pieces of hose $d$, have secured permanently thereto the air and water tight chambers or jackets $e$, which jackets or chambers are located at the under side of the pipe proper and extend about half-way around the latter. The pipe-sections F are firmly clamped in place in or upon the pontoons, but may be freed by loosening the bolts of the clamping-straps and turned to change the wearing-surfaces, it being of course evident that the greatest wear is on the lower side of the pipe.

The jackets of the pipe-sections are connected with each other by means of bails $f\ f$, which have a sliding connection $g\ h$ with said jackets, Fig. 8, while the bails themselves are pivotally connected by a pin or bolt $i$, thus permitting a lateral movement of the sections relatively to each other. A foot-board $j$ is also arranged above each pipe and connected with and supported from the jackets by the irons $k$. The rear branch G of the main discharge-pipe is or may be similarly constructed and is adapted to be swung through an arc of about two hundred and twenty degrees, while the lateral branches can each swing through an arc of one hundred and eighty degrees.

The dredge-boat can be swung through an arc of eighty-seven degrees about the spud $a$, thereby making a cut (in a dredger of the proportions shown) two hundred and twenty-five feet wide. When the boat is being propelled upstream stern foremost and the cutters allowed to trail, the discharge-pipes, preferably those at the side, will be carried to a point in rear of the cutters, as indicated by the dotted lines in Fig. 3, (denominated "bow-discharge,") and the dredged material allowed to deposit in the deep-water pools which always lie downstream from the bar-crests.

In Figs. 9 to 13 I show a simple means for maintaining the end of the discharge-pipe in proper position, such means comprising two posts or anchors $l\ l$, to which the ends of a cable $m$ are secured, said cable passing through a suitable guide or pulley $n$ on the end pontoon or jacket.

Upon reference to the diagrammatic view it will be seen that the boat, with its battery of cutters, may be moved forward or backward in a straight line or may be swung in the arc of a circle upon the pivot-spud, the cutters being arranged to be raised and lowered to vary the degree, depth, or angle of the cut. It will also be noticed that the material is discharged from either end or side, or both, from the discharge-pipes into the stream, or it may be upon the shore, so that when discharging into the water said pipes will not in any way interfere with the proper continuous manipulation of the boat, the said pipes being held in a parabolic curve extending diagonally across the stream toward the shore, with their delivery ends in such position as to deliver the spoil in the bed of the river or estuary.

Having thus described my invention, what I claim is—

1. In a hydraulic dredge, the combination of a boat; excavating mechanism adapted to cut across the width of the boat while the boat advances in a right line; means for propelling the boat in a right line; and a discharge-pipe made up of sections, each having an air and water tight jacket securely attached to it, substantially as and for the purpose set forth.

2. In combination with a boat and its discharge-pipe; the posts or anchors $l\ l$, and the rope or cable $m$ secured to said posts and passing through an eye $n$ on the pipe.

3. A discharge-pipe made up of sections, each being provided with a semicylindrical air and water tight jacket, said jacket being securely united to the pipe.

In witness whereof I hereunto set my hand in the presence of two witnesses.

LINDON W. BATES.

Witnesses:
CHAS. H. WHITING,
J. H. GLENDENING.